United States Patent [19]
Lee et al.

[11] Patent Number: 5,866,493
[45] Date of Patent: Feb. 2, 1999

[54] METHOD OF MANUFACTURING A SINTERED BODY OF INDIUM TIN OXIDE

[75] Inventors: In Gyu Lee, Seoul; Chong Kwang Yoon, Kyunggi-Do; Seung Moo Heo, Choongchungnam-Do; Se Hong Chang, Kyunggi-Do; Jung Ju Kim, Nam-Gu, all of Rep. of Korea

[73] Assignee: Korea Academy of Industrial Technology, Seoul, Rep. of Korea

[21] Appl. No.: 903,655

[22] Filed: Jul. 31, 1997

Related U.S. Application Data

[63] Continuation-in-part of Ser. No. 655,407, May 30, 1996, abandoned.

[30] Foreign Application Priority Data

Nov. 30, 1995 [KR] Rep. of Korea .................. P-95-45809

[51] Int. Cl.[6] .............................................. C04B 35/457
[52] U.S. Cl. ........................... 501/134; 501/126; 423/92; 423/115; 423/593
[58] Field of Search .................................. 501/126, 134; 423/92, 115, 593

[56] References Cited

U.S. PATENT DOCUMENTS

| | | | |
|---|---|---|---|
| 4,962,071 | 10/1990 | Bayard | 501/134 |
| 5,071,800 | 12/1991 | Iwamoto et al. | 501/126 |
| 5,401,701 | 3/1995 | Ogawa et al. | 501/134 |
| 5,417,816 | 5/1995 | Nakashima et al. | 204/96 |
| 5,480,532 | 1/1996 | Schlott et al. | 501/134 |
| 5,494,652 | 2/1996 | Robert | 423/92 |

Primary Examiner—Karl Group
Attorney, Agent, or Firm—Ladas & Parry

[57] ABSTRACT

According to the method, an aqueous salt solution containing either tin, indium or both, are mixed with an alkali to produce a slurry containing precipitated particles. Then, the slurry is maintained at a predetermined temperature range for a time sufficient to convert the precipitated particles to larger size particles by coagulation or agglomeration. The resulting slurry is then dried and calcined to produce a mixed power. The mixed power is ball milled, press molded and/or cold isostatic press (CIP) molded. The molded body is then sintered to form an ITO sintered body. The ITO sintered body obtained by this process offers superior sinterability whose theoretical density can reach more than 95%.

4 Claims, 5 Drawing Sheets

METHOD OF MANUFACTURING A SINTERED BODY OF INDIUM TIN OXIDE

CROSS-REFERENCE TO RELATED APPLICATION

This application is a continuation-in-part of application Ser. No. 08/655,407 filed on May 30, 1996, now abandoned.

BACKGROUND OF THE INVENTION

1. Field of the Invention

The present invention relates to a method of manufacturing a sintered body of indium tin oxide (ITO), particularly a method of manufacturing an ITO sintered body of improved sinterability characteristics.

2. Description of the Prior Art

An ITO sintered body is generally employed in manufacturing transparent conductive electrodes of a flat display device, e.g., a liquid crystal display device. The ITO transparent conductive electrode is generally formed by sputtering which employs an ITO sintered body target. The ITO sintered body is manufactured by mixing indium oxide powder with tin oxide powder in a predetermined ratio, pressing and molding the mixed powder to a predetermined shape, and then sintering the mixture in a sintering furnace. The mixture of indium oxide powder and tin oxide powder, or indium tin oxide powder, i.e., the ITO powder, which are used as raw materials for an ITO sintered body, are processed by thermal decomposition of metal hydroxides, organic metal salts or inorganic metal salts, sols or gels of such metals, or calcining ITO precursors obtained by means of coprecipitation, hydrolysis or precipitation under a temperature range of about 400° C. to 1,000° C.

An ITO sintered body is conventionally known to have superior characteristics when the weight ratio of its composition, i.e., indium oxide powder and tin oxide powder, is 90 wt %:10 wt % and when its density approaches its theoretical density (7.15 g/cm$^3$; $IN_2O_3$=10 wt %; $SnO_2$= 90 wt %).

Figure 1:
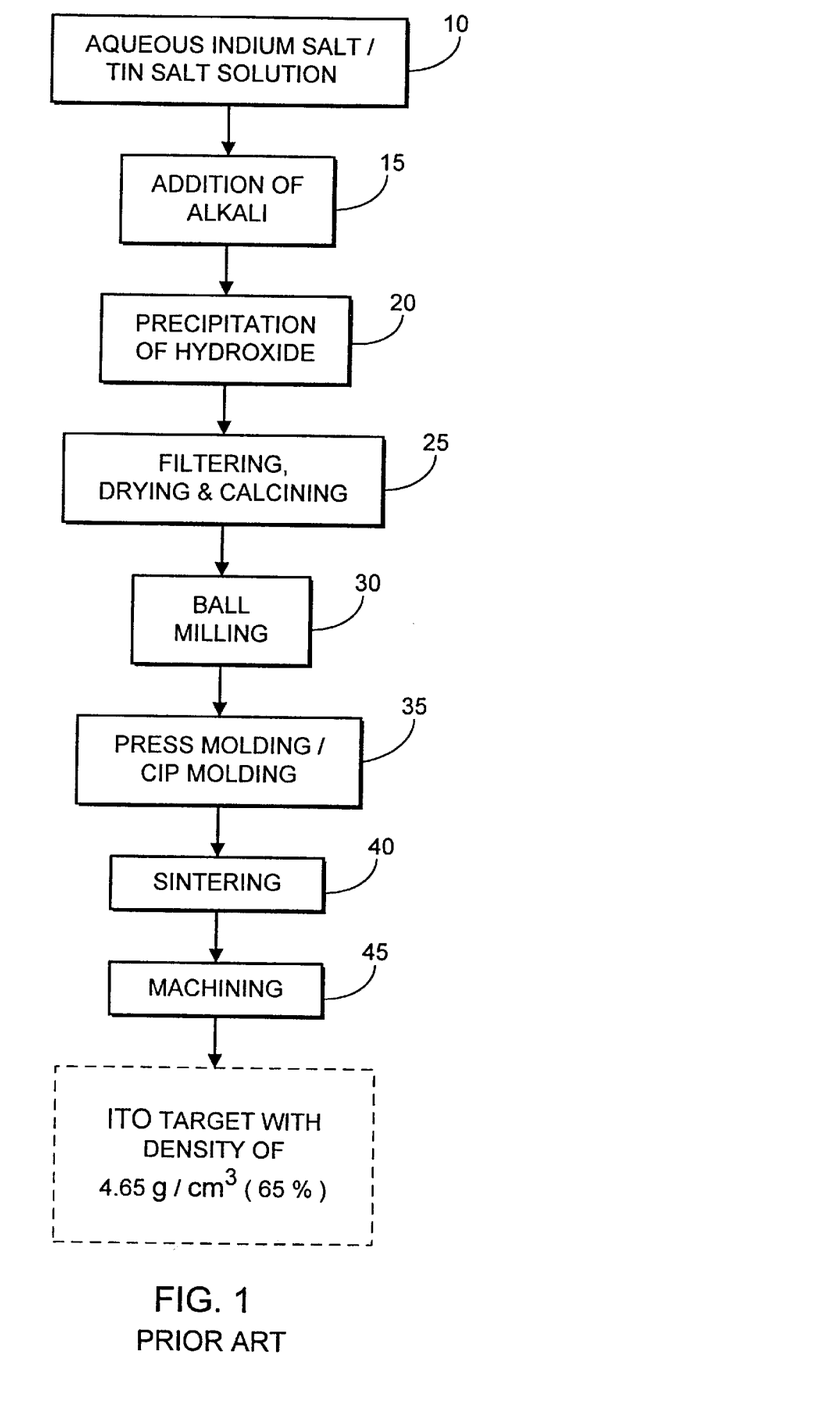
FIG. 1 is a block diagram showing the process of another conventional method of manufacturing an ITO sintered body.

FIG. 1 is a block diagram illustrating a conventional method of manufacturing an ITO sintered body based on the method described above.

Steps 10, 15 and 20 in FIG. 1 show a precipitation by adding alkali to the solution of indium salts and tin salts. Step 25 shows an amount of indium oxide powder and tin oxide powder which is mixed by filtering, drying and calcining the hydroxide precipitated in step 20. Step 30 shows ball milling of the mixed powder of indium oxide and tin oxide, i.e., ITO powder, which was produced in step 25. Step 35 shows press molding or cold isostatic press (CIP) molding of the ball-milled powder. Step 40 shows sintering the press-molded or CIP-molded body. Step 45 shows machine working of the sintered body, by which an ITO sintered body target is produced.

However, the density of an ITO sintered body composed of the indium oxide powder and tin oxide powder, which are processed by the conventional method described above, reaches merely 65% (4.65 g/cm$^3$) of the theoretical density stated above. In other words, an ITO sintered body processed by the manufacturing method illustrated in FIG. 1 possesses low electrical conductivity (specific resistivity), low thermal conductivity and low fracture strength. The reason is because the indium oxide powder and tin oxide powder, which are major constituents of an ITO sintered body, are processed with low density.

Diverse methods have been developed to manufacture a high density ITO sintered body and ITO target by employing the indium oxide powder and tin oxide powder that are processed by the method described above.

Japanese Patent No. 58-136480 discloses a method of manufacturing a high density ITO sintered body and ITO target. This method, known as "A Hot Press Sintering Method", is a method of sintering the ITO powder comprising indium oxide powder and tin oxide powder under a temperature range of about 900° C. to 1,200° C. in a graphite mold either in a vacuum or filled with inert gas.

U.S. Pat. No. 5,094,787 discloses a method of manufacturing a high density ITO sintered body by press molding the ITO powder under a pressure of about 1,000 kg/cm$^2$ and sintering the molded body under 1 to 10 oxygen atmospheric pressure.

Another method of manufacturing a high density ITO sintered body employs a hot isostatic press (HIP).

U.S. Pat. No. 4,962,071 discloses a sintering method of ITO powder of high density by adding an additive which is liquified at a sintering temperature (e.g., $Al_2O_3$+$SiO_2$).

Japanese Patent Laid-Open No. 5-17201 discloses a method of manufacturing an ITO sintered body by partially deoxidizing molded ITO powder at a high temperature or by discharging the powder for a pretreatment.

A method of manufacturing ITO powder or indium oxide powder of high sinterability other than a method of improving the sintering process is disclosed in EP 0386932, U.S. Pat. Nos. 5,417,816 and 5,401,701 in which an ordinary sintering furnace was used to manufacture a high density ITO sintered body under ordinary atmospheric pressure (1 atmospheric pressure).

Figure 2:
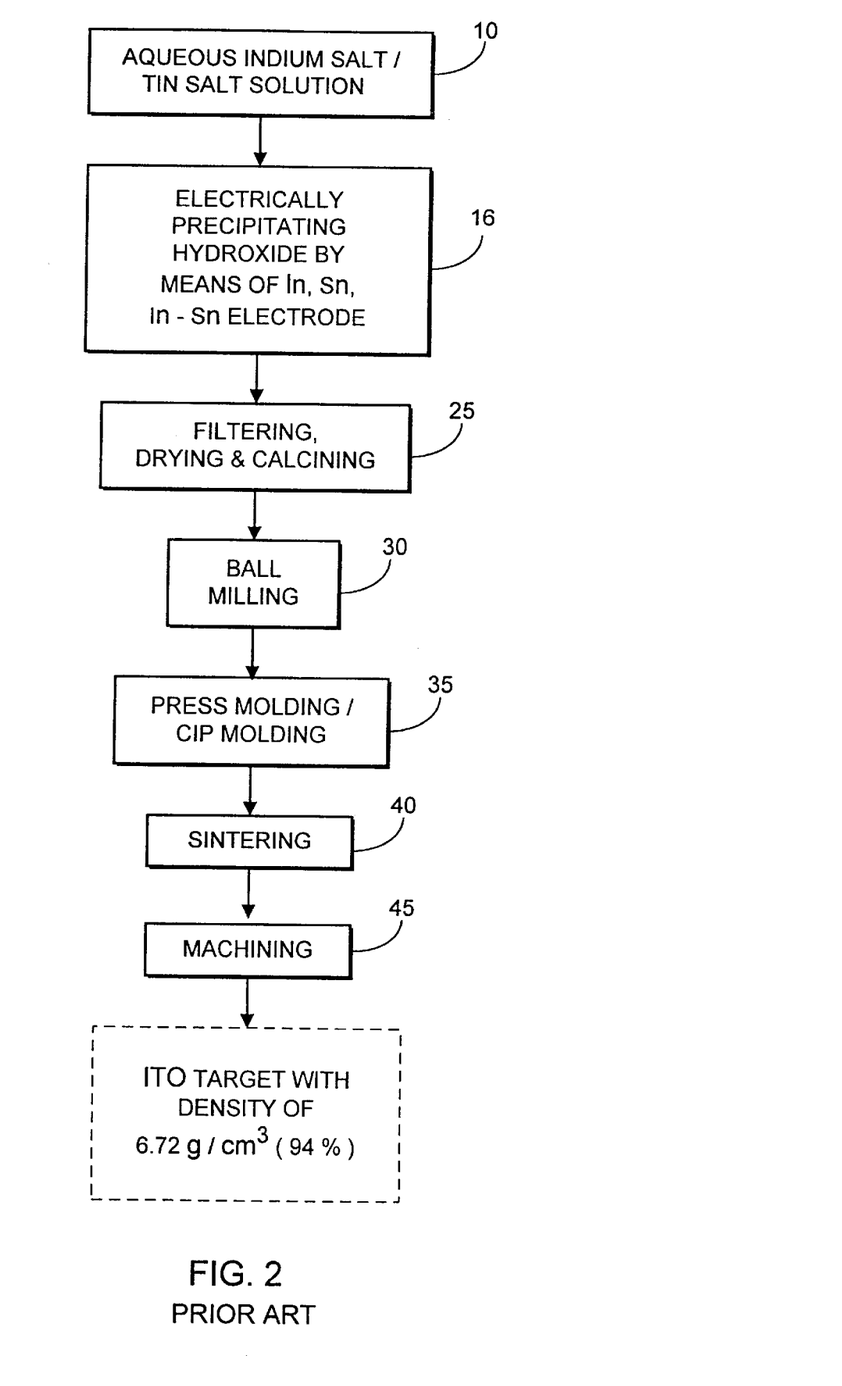
FIG. 2 is a block diagram showing the process of another conventional method of manufacturing an ITO sintered body.

FIG. 2 is a block diagram illustrating the process of manufacturing an ITO sintered body disclosed in U.S. Pat. No. 5,417,816. In this process, the addition of alkali and the hydroxide precipitation stop illustrated in FIG. 1 (step 15) are replaced with the precipitation of the solution of indium salts and tin salts by means of In, Sn and In—Sn electrodes (step 16). Other steps in FIG. 2 that are identical to those illustrated in FIG. 1 will be excluded from the present description for the sake of brevity.

The manufacturing methods described above have drawbacks in terms of economy, characteristics of the resulting sintered body, productivity of sputtering, and characteristics of the ITO film. In other words, manufacturing an ITO sintered body according to the conventional method results in sintered bodies of different densities, different production costs and different characteristics of ITO targets depending on the manufacturing method that is applied.

SUMMARY OF THE INVENTION

The object of the present invention is to overcome the drawbacks described above. Accordingly, it is an object of the present invention to provide a method of manufacturing an ITO sintered body by converting a primary ITO particle in the form of a precipitated slurry into a secondary particle of superior sinterability so that an ITO sintered body of preferably more than 95% of the theoretical density can be manufactured at the temperature range of about 1,350° C. to 1,650° C. and under atmospheric pressures It is still another object of the present invention to provide a method of manufacturing an ITO sintered body that can reduce milling time, lower molding pressure, and reduce production costs.

According to one aspect of the present invention, there is provided a method of manufacturing an ITO sintered body, comprising the steps of:

mixing aqueous indium salt and tin salt solutions, and an alkali at predetermined temperature range to obtain a precipitated slurry containing primary particles;

aging the slurry under a predetermined temperature range to form secondary particles having sizes larger than the primary particles;

forming a powder from the slurry containing secondary particles;

forming a molded body from the powder; and sintering the molded body to produce the ITO sintered body.

The step of maintaining includes the step of aging the slurry under a temperature range of from 0 to 100 degrees Celsius for 10 to 120 hours without stirring the slurry. According to the present invention, the primary particles include particles of cubic phase and particles of quasi-stable amorphous phase, during the aging step, the quasi-stable amorphous phase particles are converted to the cubic phase particles.

Preferably, the step of mixing includes the steps of mixing the aqueous indium salt and tin salt solutions and adding the alkali to the mixed solution to obtain the precipitated slurry containing the primary particles.

And preferably, the step of forming a powder includes the steps of filtering the slurry containing the secondary particles and drying and calcining the filtered slurry at a first and second temperature, respectively, to obtain the powder.

According to another aspect of the present invention, there is provided a method of manufacturing an ITO sintered body comprising the steps of:

mixing a first aqueous salt solution and an alkali to obtain a first precipitated slurry containing primary particles;

aging the first slurry under a first predetermined temperature range to form secondary particles from the primary particles, the secondary particles having sizes larger than the primary particles;

forming a powder from the first slurry containing the secondary particles;

forming a molded body from the powder; and sintering the molded body to produce the ITO sintered body.

According to another aspect of the present invention, there is provided a method of manufacturing an ITO sintered body comprising the steps of:

mixing first and second aqueous salt solutions and an alkali to obtain a precipitated slurry containing primary particles including particles of cubic phase and particles of quasi-stable amorphous phase;

aging the slurry under a temperature range of from 0 to 100 degrees Celsius for a predetermined time to form secondary particles from coagulation of the primary particles, the secondary particles having sizes larger than the primary particles;

forming a powder from the slurry containing the secondary particles;

forming a molded body from the powder; and sintering the molded body to produce the ITO sintered body.

BRIEF DESCRIPTION OF THE DRAWINGS

The objects, characteristics and advantages of the present invention are disclosed in the following detailed description of the preferred examples and the accompanying drawings in which.

DETAILED DESCRIPTION OF THE PREFERRED EXAMPLES

Figure 3:
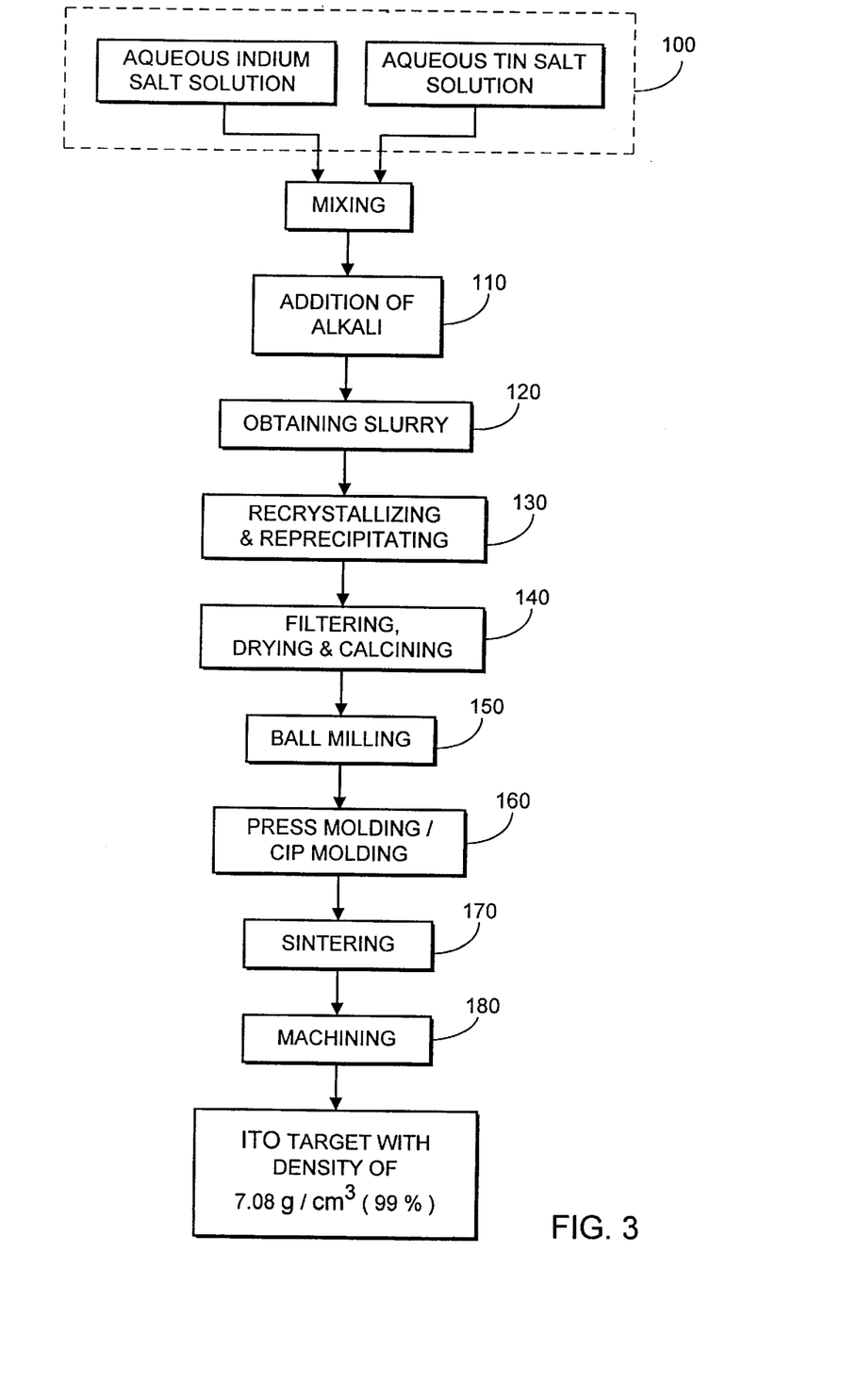
FIGS. 3, 4 and 5 are block diagrams showing the process of the method of manufacturing an ITO sintered body according to each example of the present invention.

FIG. 3 shows a method of manufacturing an ITO sintered body according to one example of the present invention.

In the method of manufacturing an ITO sintered body according to the present invention as shown in FIG. 3, an ITO sintered body of high density is manufactured by mixing the indium oxide powder or ITO powder of high sinterability with tin oxide powder, molding the mixed powder with press molding or CIP molding, and sintering the molded body under atmospheric pressure.

Thus, the method of manufacturing an ITO sintered body according to the present invention comprises the steps of:

mixing solution of indium nitrate (or indium sulfate) of a predetermined concentration with a solution of tin hydrochloride of a predetermined concentration at predetermined temperature range (step 100);

adding ammonium hydroxide to the mixed solution to obtain a precipitated slurry containing primary particles (steps 110 and 120);

aging the precipitated slurry at a predetermined temperature for a predetermined time to form secondary particles having sizes larger than the primary particles (step 130);

filtering the solution precipitated at the aging step (step 130), drying it at a first temperature, and then calcining it at a second temperature (step 140);

ball milling and press molding or CIP molding the calcined powder under a predetermined pressure to produce a molded body in a predetermined shape (steps 150 and 160);

sintering the molded body at a third temperature for a predetermined time to form an ITO sintered body (step 170); and mechanically processing the ITO sintered body (step 180).

Figure 4:
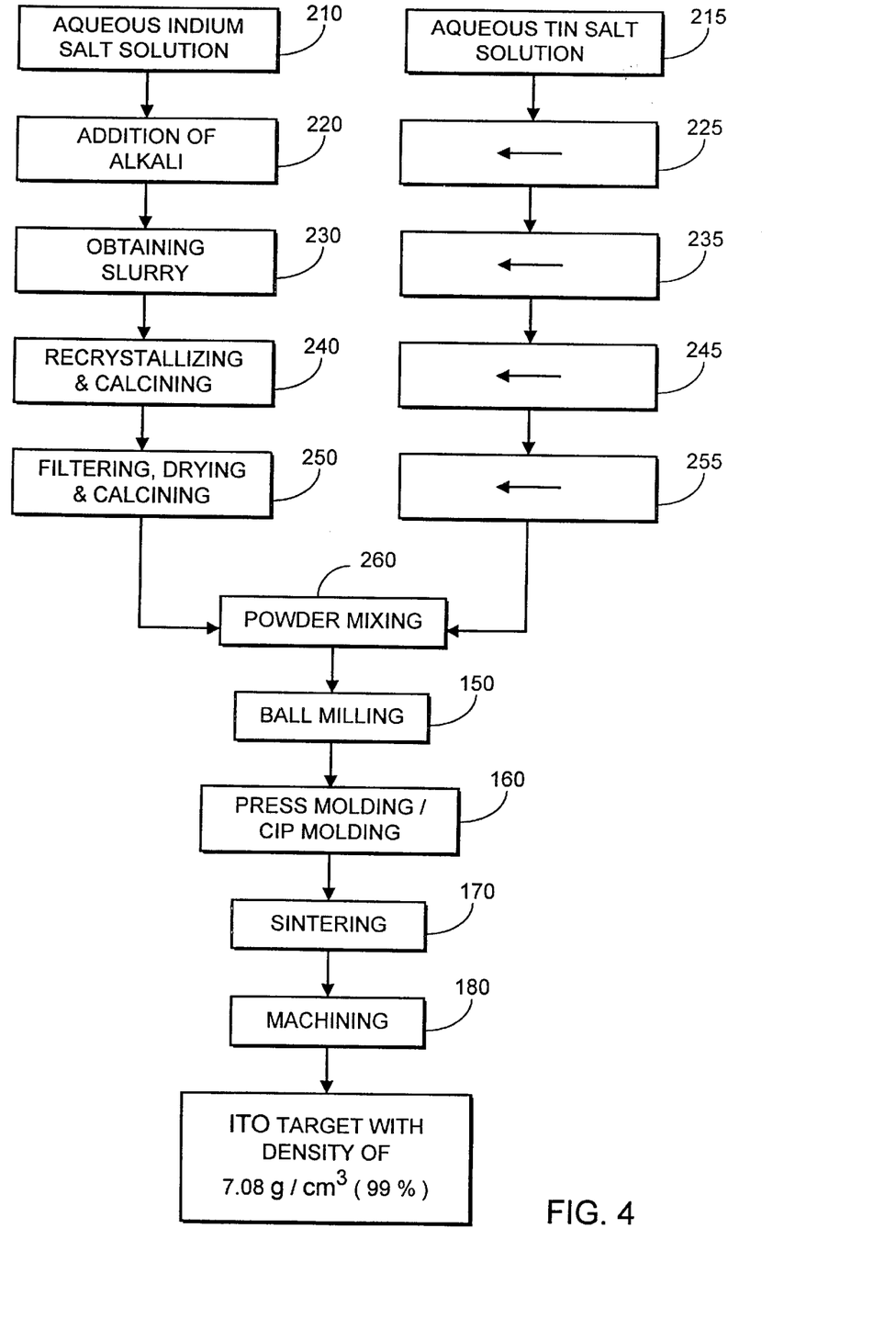

FIG. 4 shows a method of manufacturing an ITO sintered body according to another example of the present invention. The method of manufacturing an ITO sintered body according to the present invention as shown in FIG. 4 comprises the steps of:

preparing a solution of indium nitrate (or indium sulfate) of predetermined concentration and a solution of tin hydrochloride of a predetermined concentration at a predetermined temperature range, respectively, mixing the solutions and adding ammonium hydroxide thereto to obtain a precipitated slurry containing primary particles (steps 220 to 230 and 215 to 235);

aging each of the precipitated slurries at a predetermined temperature range for a predetermined time period to form secondary particles having sizes larger than the primary particles by coagulation (steps 240 and 245);

filtering each of the solutions in the aging steps (steps 240, 245), drying it at a first temperature, and then calcining it at a second temperature (steps 250 and 255); and mixing the respective calcined powders, i.e., indium oxide powder and tin oxide powder, in a predetermined theoretical weight ratio (e.g., $In_2O_3:SnO_2=90$ wt %:10 wt %) to produce a mixed powder (step 260).

The processing steps after the mixing step in FIG. 4 comprises the steps of:

ball milling and press molding or CIP molding the mixed powder under a predetermined pressure to produce a molded body in a predetermined shape (steps 150 and 160);

sintering the molded body at a third temperature for a predetermined time to form an ITO sintered body (step 170); and mechanically processing the ITO sintered body (step 180).

Figure 5:
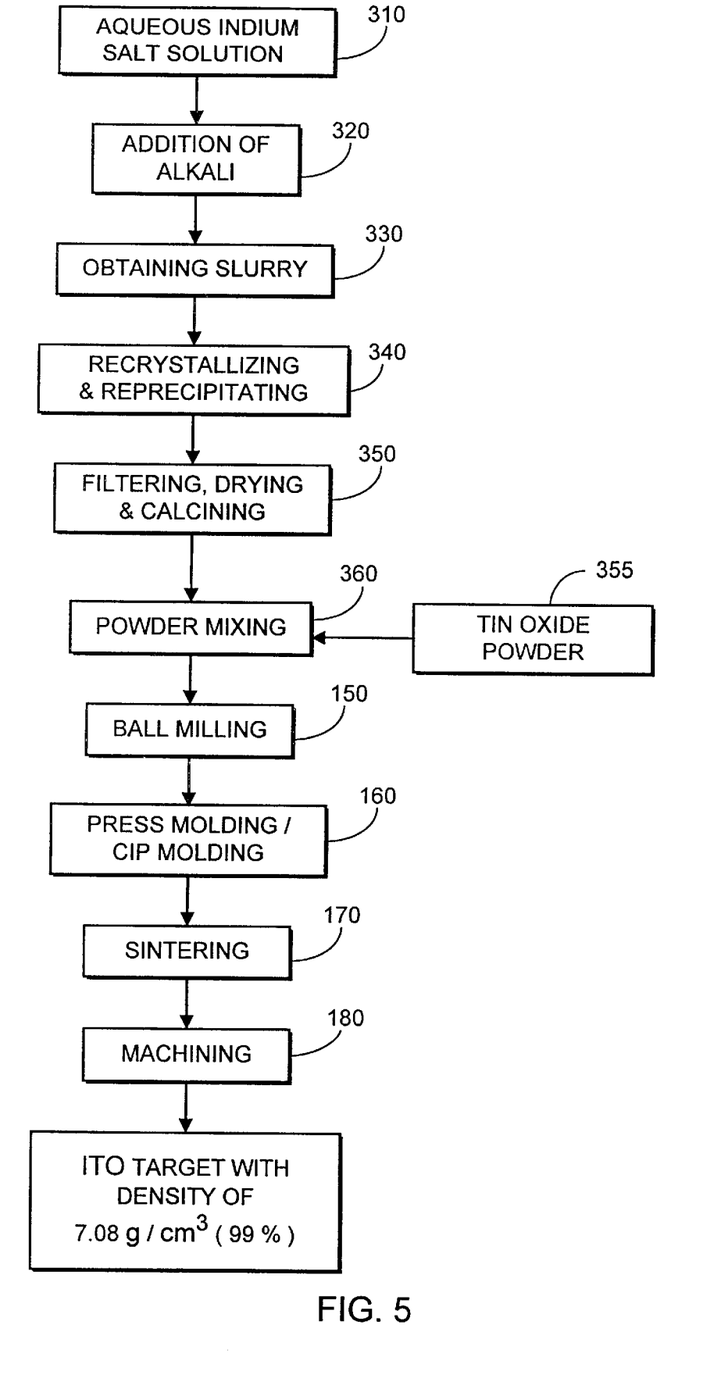

FIG. 5 shows a method of manufacturing an ITO sintered body according to another example of the present invention. The method of manufacturing an indium oxide powder, which occupies 90% of the weight ratio of an ITO sintered body and influences the characteristics of the ITO sintered body, according to the present invention as shown in FIG. 5 comprises the steps of:

preparing a solution of indium nitrate (or indium sulfate) of a predetermined concentration, and adding ammonium hydroxide thereto to obtain a precipitated slurry containing primary particles (steps 310 to 330);

aging the slurry at a predetermined temperature range for a determined time period to form secondary particles having sizes larger than the primary particles (step 340);

filtering the solution precipitated at the aging step (step 340), drying it at a first temperature, and then calcining it at a second temperature (step 350);

preparing the calcined powder, i.e., indium oxide powder, and a predetermined amount of tin oxide powder, which has been processed by the method other than that of the present invention, (step 355); and mixing the respective powders in a predetermined theoretical weight ratio (e.g., $In_2O_3:SnO_2=90$ wt %:10 wt %) (step 360).

The processing steps in FIG. 5 after the mixing step comprise the same steps as those shown in FIGS. 3 or 4, i.e.:

ball milling and press molding or CIP molding the mixed powder under a predetermined pressure to produce a molded body in a predetermined shape (steps 150 and 160);

sintering the molded body under a third temperature for a predetermined time to form an ITO sintered body (step 170); and mechanically processing the ITO sintered body (step 180).

The following description will describe in greater detail the above method of manufacturing an ITO sintered body with reference to FIGS. 3 to 5.

The present invention is directed to a method of manufacturing a high density ITO sintered body by mixing indium oxide powder or ITO powder of high sinterability with tin oxide powder, and then ball milling, press molding and/or CIP molding, and sintering the mixed powder under atmospheric pressure in this process, the indium oxide powder and tin oxide powder constituting an ITO sintered body may be simultaneously processed by mixing the powders with salt solutions in a predetermined ratio or by respectively precipitating and coagulating the powders according to the present invention. Or, indium oxide powder alone may be processed according to the present invention, while tin oxide powder which has been processed according to the conventional method may be employed in the present invention.

The indium oxide powder or ITO powder of high sinterability employed in the present invention can be preferably processed according to the following method.

As shown in FIG. 3, an aqueous indium salt solution and an aqueous tin salt solution at a predetermined temperature range are prepared and mixed at a ratio of [In]/[Sn]=10 (step 100). An alkali aqueous solution is added to the mixed aqueous salt solution at a rate of faster than [OH]/[metal ion]=100 per minute and mixed for a time sufficient to obtain a precipitated slurry containing primary particles which comprise particles of a stable cubic phase and of quasi-stable amorphous phase (steps 100 to 120). The temperature range for these steps is preferably 0° C. to 80° C. The mixing time is sufficient to obtain the aforementioned particles and can be, for example, between 2 minutes to 10 minutes. The indium salt to be employed in these steps is preferably indium nitrate or indium sulfate, and the tin salt is preferably tin hydrochloride. The PH of the precipitated solution is preferably 7 to 12. The alkali aqueous solution to be employed in step 110 is preferably an aqueous ammonium hydroxide or urea solution. Ammonium hydroxide is preferred to sodium hydroxide or potassium hydroxide which may be employed for an alkali aqueous solution but is liable to affect the purity of a resulting sintered body. Salts of any concentration range may be employed in these steps. However, the preferred concentration range is from 0.01M to 5M which best suits the desired PH.

At step 130, the precipitated slurry formed at step 120 is maintained under a temperature range of 0° C. to 100° C. for a time sufficient for the primary particles to coagulate to form the secondary particles and can be, for example, about 10 hours to 5 days, depending on the particular temperature range chosen and the desired concentration of an ITO sintered body, to form secondary particles having sizes larger than the primary particles. In step 130, the primary particles are coagulated or agglomerated to form the secondary particles. At step 140, the precipitated slurry containing the secondary particles is filtered, and dried under a temperature range of 70° C. to 120° C. The indium tin oxide powder is processed after calcining the dried slurry under the temperature range of 400° C. to 1,000° C. (step 140). The weight composition ratio of the indium tin oxide powder can be adjusted to be the ratio of a commercial sintered body target ($In_2O_3:SnO_2=90$ wt %.:10 wt %:5 wt %). The reason for aging the precipitated slurry under a particular temperature range is to produce a powder which will not be aggregated in the calcining process, to remove impurities such as chloric ion, and to enhance the sinterability when sintering it. The preferred temperature range for the aging step 130 is 0° C. to 100° C. Higher temperatures, which may reduce time spent for the aging step, cause a problem in controlling the time of reaction. Lower temperatures during the aging step result in larger size particles. It is therefore preferable to set an appropriate temperature range according to the concentration of an ITO sintered body.

An improved ITO sintered body is manufactured by ball milling the indium tin oxide powder, which is then CIP molded (or press molded) under a pressure of about 2,000 kg/cm² and is sintered at a temperature of about 1450° C. for 5 hours (steps 150 to 170). An ultimate ITO target is produced by mechanically processing the ITO sintered body (step 180).

Another example of the present invention is shown in FIG. 4. According to FIG. 4, an aqueous indium salt solution and an aqueous tin salt solution are respectively prepared, to which each alkali is added. The solutions are then precipitated to a slurry, and then aged or maintained at a predetermined temperature or temperature range for a predetermined time to form a slurry containing secondary particles having sizes larger than the primary particles (steps 210 to 250 and 215 to 255). The secondary particles are formed from coagulation of the primary particles. Each of the slurries containing the secondary particles at steps 230 and 235 are filtered, dried and calcined to produce indium oxide powder and tin oxide powder, respectively (steps 250 and 255). The calcined powders are mixed to a predetermined ratio (step 200). The processing steps after the mixing step comprise the same steps as shown in FIG. 3. The conditions for precipitation and coagulation, filtering, drying and calcination in these processing steps are exactly the same as shown in FIG. 3.

The advantage resulting from applying the above method is that the composition ratio of the produced ITO sintered body can be precisely adjusted by weighing and mixing the constituent powders.

Another example of the present invention is shown in FIG. 5. According to FIG. 5, an aqueous indium salt solution is prepared, to which an alkali aqueous solution is added. The solution is then precipitated to a slurry containing primary particles, and then aged or maintained at a predetermined temperature range as discussed with reference to FIG. 3 to form second particles having sizes larger than the primary particles (steps 310 to 340). The resulting slurry is filtered, dried, and calcined to produce an indium oxide powder (step 350). The indium oxide powder is mixed with tin oxide powder, which has been processed by a conventional method, to a predetermined ratio (step 360). The processing steps after mixing the indium oxide powder and tin oxide powder are shown in FIGS. 3 or 4. The conditions for precipitation/coagulation, filtering, drying and calcination in these processing steps are exactly the same as shown in FIG. 3.

The advantage resulting from applying the above method is that processing the indium oxide powder alone and employing the tin oxide powder from another resource serves to simplify the manufacturing procedure.

The following description will provide a more detailed explanation of the present invention.

The solution of indium nitrate of about 0.01M to 5M concentration is mixed with the solution of tin hydrochloride of about 0.01M to 5M concentration. A precipitated slurry containing primary particles is formed from the mixed solution by adding ammonium hydroxide of 0.1M to 10M concentration at a rate of faster than [OH]/[metal ion]=100 per minute. The precipitated slurry is then maintained at a predetermined temperature range to form secondary particles having sizes larger than the primary particles and filtered at a temperature of 25° C. The filtered ITO hydroxide is dried and calcined at the temperatures of about 100° C. and 600° C., respectively. The calcined ITO powder is CIP molded under a pressure of 2,000 kg/cm$^2$. The same pressure as used in the CIP molding (or press molding) may be applied to all examples of the present invention. Then, the ITO molded body is sintered at a temperature of about 1,500° C. for about 5 hours to produce an ITO sintered body of about 7.08 g/cm$^3$ density (99% of the theoretical density).

The method of manufacturing an ITO sintered body according to the present invention as described above provides an advantage of producing an ITO sintered body of a density higher than 95% of the theoretical density under the low sintering temperature range of 1,350° C. to 1,650° C. due to the production of a powder of high sinterability by the precipitating and aging steps. Also, the powder produced by the two step process is not aggregated, thereby reducing the time spent for milling. Sintering in an ordinary sintering furnace after molding serves to reduce the producing equipment and increase the productivity than sintering in an HIP furnace or an oxygen pressure furnace. These elements eventually serve to reduce the production costs of an ITO sintered body.

The present invention will now be described in detail with reference to the following non-limiting examples.

EXAMPLE 1

An aqueous solution of 0.33 mol/l was prepared by mixing indium nitrate with tin hydrochloride at a mixing ratio of [In]/[Sn]=10. The aqueous solution was a dissolution of indium nitrate of 0.3 mol with tin hydrochloride of 0.034 mol into the water of 1 liter. The indium/tin hydroxide was coprecipitated by an addition of ammonia at a mixing speed of faster than [OH]/[metal ion]=100 per minute and under a temperature of 15°. The resultant slurry contained a great number of primary particles of a stable cubic phase as well as of a quasi-stable amorphous phase.

The solution containing the slurry was aged or maintained under a temperature of 25° C. for more than 48 hours, thereby forming secondary particles of sizes larger than the primary particles. Then, all of the particles of an amorphous phase were transformed into those of a cubic phase.

The resulting slurry containing the secondary particles was filtered, dried under a temperature of 100° C., and then calcined under a temperature of 600° C. The BET surface area of the obtained powder was 57 m$^2$/g.

The obtained powder was analyzed by an X-ray diffraction method. The analysis confirmed that the powder was indium/tin oxide exclusively composed of particles of a cubic phase. The powder was molded by the cold hydrostatic press (CIP) under a pressure of 2 ton/cm$^2$, and then sintered under a temperature of 1500° C. for 5 hours. The obtained sintered body had 99% of a theoretical density, i.e., 7.08 g/cm$^3$.

COMPARATIVE EXAMPLE 1

An aqueous solution of 0.33 mol/l was prepared by mixing indium nitrate with tin hydrochloride at a mixing ratio of [In]/[Sn]=10. The aqueous solution was a dissolution of indium nitrate of 0.3 mol with tin hydrochloride of 0.034 mol into the water of 1 l. The indium/tin hydroxide was coprecipitated by an addition of ammonia at a rate of faster than [OH]/[metal ion]=100 per minute and under a temperature of 15° C. The resultant slurry contained a great number of particles of a stable cubic phase as well as of a quasi-stable amorphous phase.

Without undergoing the aging step, the mixture of indium/tin hydroxide was filtered, dried under a temperature of 100° C., and then calcined under a temperature of 600° C. The BET surface area of the obtained powder was 35 m$^2$/g.

The obtained powder was analyzed by an X-ray diffraction method. The analysis confirmed that the powder was indium/tin oxide containing a great number of particles of a rhomobohedral phase as well as of a cubic phase. The powder was molded by the cold hydrostatic press (CIP) under a pressure of 2 ton/cm$^2$, and then sintered under a temperature of 1500° C. for 5 hours. The obtained sintered body had 73% of a theoretical density, i.e., 5.08 g/cm$^3$.

EXAMPLE 2

Amonia was added to an aqueous solution of 0.33 mol/l at a mixing speed of faster than [OH]/[metal ion]=100 per minute under a temperature of 15° C. The mixture was precipitated to be a hydroxide containing primary particles of a stable cubic phase and of a quasi-stable amorphous phase. The precipitated slurry was aged or maintained for 48 hours under a temperature of 25° C. in the aging step so as to transform substantially all of the particles of an amorphous phase into those of a cubic phase.

The resulting slurry was filtered, dried under a temperature of 100° C., and calcined under a temperature of 600° C. The BET surface area of the obtained indium/tin hydroxide powder had 95% of a theoretical density, i.e., 6.80 m²/g.

The indium/tin hydroxide powder was ball-milled by methanol and mixed with $SnO_2$ powder of commercial use having 8 μm of an average diameter.

The present invention is not limited to the aforementioned examples. Also, it is evident that an ordinary person skilled in the pertinent art can easily carry out many other varied examples within the scope of the technical concept of the present invention.

What is claimed is:

1. A method of manufacturing an ITO sintered body, comprising the steps of;

mixing aqueous indium salt and tin salt solutions, and an alkali to obtain a precipitated slurry containing primary particles including particles of cubic phase and particles of quasi-stable amorphous phase;

aging the slurry at a temperature of from 0 to 100 degrees Celsius for a time sufficient to chance substantially all the primary particles in the slurry to the cubic phase to form secondary particles having the cubic phase and having sizes larger than the primary particles;

forming a powder from the slurry containing secondary particles;

forming a molded body from the powder; and sintering the molded body to produce the ITO sintered body.

2. The method according to claim 1, wherein the concentration of the aqueous salt solutions ranges from 0.01M to 5M.

3. A method of manufacturing an ITO sintered body, comprising the steps of:

mixing an aqueous indium salt solution and an alkali to obtain a first precipitated slurry containing primary particles including particles of cubic phase and particles of quasi-stable amorphous phase;

aging the first slurry at a temperature of from 0 to 100 degrees Celsius for a time sufficient to chance substantially all the primary particles in the fight slurry to the cubic phase to form secondary particles from the primary particles, the secondary particles having the cubic phase and having sizes larger than the primary particles;

mixing an aqueous tin salt solution and an alkali to obtain a second precipitated slurry containing the primary particles including particles of cubic phase and particles of quasi-stable amorphous phase;

aging the second slurry at a temperature of from 0 to 100 degrees Celsius for a time sufficient to chance substantially all the primary particles in the second slurry to the cubic phase to form the secondary particles from the primary particles, the secondary particles of the second slurry having the cubic phase and having sizes larder than the primary particles forming a powder from the first and second slurries containing the secondary particles;

forming a molded body from the powder; and sintering the molded body to produce the ITO sintered body.

4. A method of manufacturing an ITO sintered body, comprising the steps of:

adding an alkali to an aqueous indium salt solution to obtain a precipitated slurry containing primary particles including particles of cubic phase and particles of quasi-stable amorphous phase;

aging the slurry at a temperature of from 0 to 100 degrees Celsius for a time sufficient to change substantially all primary particles in the slurry to the cubic phase to form secondary particles from coagulation of the primary particles, the secondary particles having sizes larger than the primary particles;

forming an indium oxide powder from the slurry containing the secondary particles;

mixing a tin oxide powder with the indium oxide powder;

forming a molded body from the mixed powder; and sintering the molded body to produce the ITO sintered body.

* * * * *